(No Model.)

P. MEDART.
PULLEY.

No. 287,843. Patented Nov. 6, 1883.

UNITED STATES PATENT OFFICE.

PHILIP MEDART, OF ST. LOUIS, MISSOURI, ASSIGNOR OF ONE-HALF TO WILLIAM MEDART, OF SAME PLACE.

PULLEY.

SPECIFICATION forming part of Letters Patent No. 287,843, dated November 6, 1883.

Application filed August 9, 1883. (No model.)

*To all whom it may concern:*

Be it known that I, PHILIP MEDART, a citizen of the United States, residing at St. Louis, in the State of Missouri, have invented certain Improvements in Pulleys, of which the following is a specification.

My invention is designed for use specially where adjoining fast and loose pulleys are arranged upon the shafting; and it consists, primarily, in providing the loose pulley with a sleeve-bearing, on which the pulley proper may be adjusted laterally to vary its relation to the fixed pulley.

Figure 1:
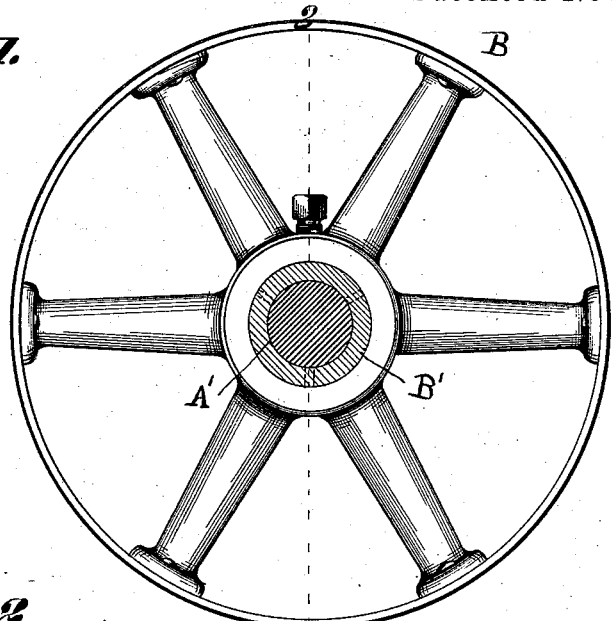
Figure 2:
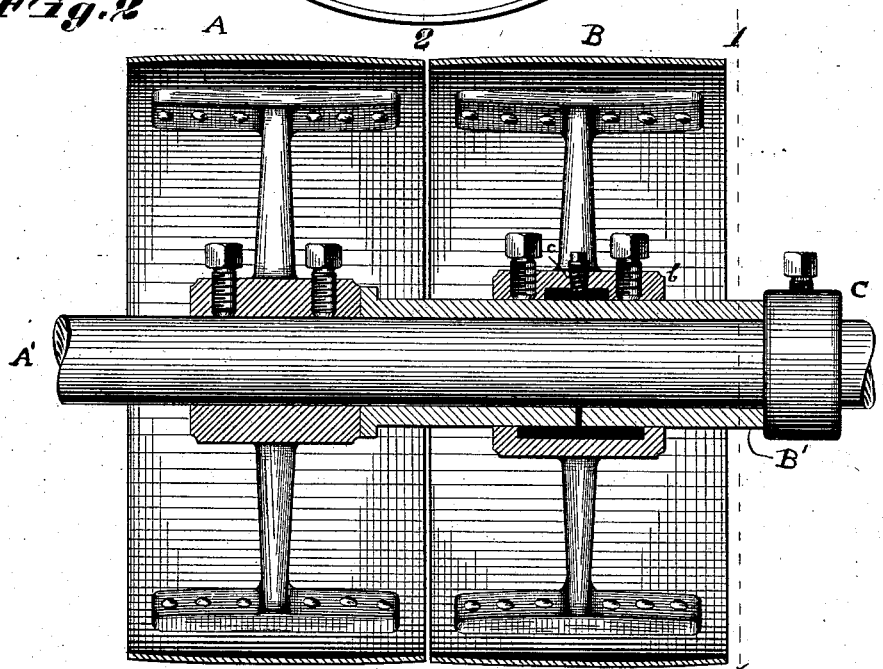

In the accompanying drawings, Figure 1 is a side view, showing the pulley-bearing in section on the line 1 1 of Fig. 2; and Fig. 2 is a transverse section on the line 2 2 of Figs 1 and 2.

The fixed pulley A is mounted on the shafting A', and may be securely fixed thereon by means of set-screws, as usual. The loose pulley B is provided with a central sleeve, B', which forms the bearing for the shaft A', and on which the pulley proper may be adjusted sidewise and secured in any desired position by means of set-screws. The sleeve or loose pulley may be held in position against the hub of the fixed pulley by a collar, C, on the shaft, which is held in place by a set-screw. Obviously the loose pulley may be arranged at any desired distance from the fixed one, and may be adjusted as circumstances may require. Of course this construction may be applied to a fixed pulley, if desired, in which case set-screws would have to be provided for binding the sleeve on the shafting. In order to keep the long bearing of the loose pulley properly oiled, I form an annular recess or oil-chamber in the interior of the hub *b* of the loose pulley, and this chamber is connected by one or more apertures through the sleeve B' with the interior of the sleeve or bearing of the shaft. The oil-chamber is supplied through an opening, *c*, which is closed by a screw-plug, as shown.

It is not deemed necessary to further describe the details of construction of the pulleys, as my invention is obviously applicable to pulleys of any class.

Aside from the advantage of adjusting the loose pulley relatively to the fixed one in case of wear, my invention presents the additional advantages that the sleeve of the pulley, when worn, can readily be replaced at a small cost, and fast and loose pulleys can be made from common castings without long hubs to suit the faces of the pulley.

What I claim is—

1. The combination, substantially as set forth, of a shaft, a bearing-sleeve capable of endwise movement loosely mounted thereon, a pulley mounted on the sleeve so that it can be adjusted laterally thereon, and means for holding the pulley in any desired position on the sleeve.

2. The combination, substantially as set forth, of the shaft, the fixed pulley mounted thereon, the loose pulley, the central bearing-sleeve on which the loose pulley is mounted, means for adjusting the loose pulley on the sleeve, and means for holding the sleeve in a proper relation to the fixed pulley.

3. The combination, substantially as set forth, of a pulley, the central bearing-sleeve on which the pulley is adjustably mounted, the oil-chamber in the hub of the pulley, and the oil-opening through the sleeve, the oil chamber and opening being so arranged that oil may be supplied to the bearing on the shaft in the lateral adjustments of the pulley.

In testimony whereof I have hereunto subscribed my name this 6th day of August, A. D. 1883.

PHILIP MEDART.

Witnesses:
 WM. MEDART,
 EUGENE WOLF.